US008880479B2

(12) United States Patent
Whisenant et al.

(10) Patent No.: US 8,880,479 B2
(45) Date of Patent: Nov. 4, 2014

(54) DATABASE RECOVERY PROGRESS REPORT (75) Inventors: James L. Whisenant, Austin, TX (US);
James T. Rabbitt, Austin, TX (US);
William J. Pothoff, Austin, TX (US);
Thomas G. Price, Austin, TX (US)

(73) Assignee: BMC Software, Inc., Houston, TX (US)

( * ) Notice: Subject to any disclaimer, the term of this patent is extended or adjusted under 35 U.S.C. 154(b) by 244 days.

(21) Appl. No.: 13/340,302

(22) Filed: Dec. 29, 2011

(65) Prior Publication Data
US 2013/0173558 A1 Jul. 4, 2013

(51) Int. Cl.
*G06F 17/30* (2006.01)

(52) U.S. Cl.
USPC ............ 707/674; 707/678; 707/685; 707/686

(58) Field of Classification Search
USPC .......................... 707/609, 674, 678, 685–686
See application file for complete search history.

(56) References Cited

U.S. PATENT DOCUMENTS

| 5,887,274 | A  | * | 3/1999  | Barry et al. ........................ 1/1 |
| 6,272,503 | B1 | * | 8/2001  | Bridge et al. ...................... 1/1 |
| 6,349,321 | B1 | * | 2/2002  | Katayama .................... 718/103 |
| 6,618,794 | B1 | * | 9/2003  | Sicola et al. ................. 711/154 |
| 6,857,053 | B2 | * | 2/2005  | Smith et al. .................. 711/162 |
| 6,985,901 | B1 | * | 1/2006  | Sachse et al. ...................... 1/1 |
| 7,039,669 | B1 | * | 5/2006  | Wong et al. ................... 709/201 |
| 7,133,884 | B1 | * | 11/2006 | Murley et al. ...................... 1/1 |
| 7,383,463 | B2 | * | 6/2008  | Hayden et al. ................ 714/4.11 |
| 7,552,139 | B2 | * | 6/2009  | Smith et al. ....................... 1/1 |
| 7,676,692 | B2 | * | 3/2010  | Costlow et al. ................. 714/16 |
| 7,707,455 | B2 | * | 4/2010  | Anand et al. ................. 714/6.12 |
| 2003/0105765 | A1 | * | 6/2003  | Smith et al. .................... 707/100 |
| 2004/0034643 | A1 | * | 2/2004  | Bonner et al. ................ 707/100 |
| 2004/0205206 | A1 | * | 10/2004 | Naik et al. .................... 709/230 |
| 2005/0076070 | A1 | * | 4/2005  | Mikami ........................ 707/204 |
| 2006/0053088 | A1 | * | 3/2006  | Ali et al. ........................... 707/1 |
| 2006/0053121 | A1 | * | 3/2006  | Zizys et al. ................... 707/100 |
| 2006/0053178 | A1 | * | 3/2006  | van Ingen et al. ............. 707/204 |
| 2006/0053181 | A1 | * | 3/2006  | Anand et al. ................. 707/204 |
| 2006/0053182 | A1 | * | 3/2006  | Sen et al. ...................... 707/204 |
| 2006/0053304 | A1 | * | 3/2006  | Fries et al. .................... 713/189 |
| 2006/0053305 | A1 | * | 3/2006  | Wahlert et al. ................ 713/189 |
| 2006/0053347 | A1 | * | 3/2006  | van Ingen et al. .............. 714/47 |

(Continued)

OTHER PUBLICATIONS

Kandoth, Suresh B., "Tracking Database Recovery Progress Using Information from DVM", INET CSS SQL Escalation Services, Dec. 29, 2010, Document Available at: <URL:http://blogs.msdn.com/b/psssqljarchive/2010/12/29/tracking-database-recovery-progress-using-information-from-dmv.aspx>, 6 pages.

(Continued)

*Primary Examiner* — Hanh Thai
(74) *Attorney, Agent, or Firm* — Brake Hughes Bellermann LLP (57) ABSTRACT

The present description refers to a computer implemented method, computer program product, and computer system for receiving a start time, selecting one or more database objects for which a database recovery progress report is to be provided, determining, based on an object recovery table generated by the database recovery utility, which of the selected database objects have been recovered since the start time, and outputting a database recovery progress report that identifies at least a number or percentage of the selected database objects that have been recovered by the database recovery utility since the start time.

22 Claims, 5 Drawing Sheets

(56) References Cited

U.S. PATENT DOCUMENTS

| | | | |
|---|---|---|---|
| 2007/0198591 A1* | 8/2007 | Teng et al. | 707/200 |
| 2008/0243945 A1* | 10/2008 | Hanus et al. | 707/202 |
| 2009/0113241 A1* | 4/2009 | van Ingen et al. | 714/21 |
| 2009/0216798 A1* | 8/2009 | Wahlert et al. | 707/103 R |
| 2010/0205157 A1* | 8/2010 | Hanus et al. | 707/690 |
| 2010/0262583 A1* | 10/2010 | Ingen et al. | 707/661 |
| 2011/0196842 A1* | 8/2011 | Timashev et al. | 707/679 |
| 2012/0084265 A1* | 4/2012 | Wahlert et al. | 707/674 |
| 2012/0109899 A1* | 5/2012 | Wahlert et al. | 707/674 |

OTHER PUBLICATIONS

Koglin et al., "Efficient and Secure Content Processing and Distribution by Cooperative Intermediaries", IEEE Transactions on Parallel and Distributed Systems, vol. 19. No. 5, May 1, 2008, pp. 615-626.

Akkus et al., "Data Recovery for Web Applications", 2010 IEEE/IFIP International Conference on, IEEE Piscataway , NJ, USA, XP031730076, ISBN: 978-1-4244-7500-1, Jun. 28, 2010, pp. 81-90.

European Search Report for European Patent Application No. 12194450.8 mailed on Mar. 7, 2013, 3 pages.

European Office Action for European Application No. 12194450.8 mailed Apr. 16, 2013, 6 pages.

* cited by examiner

FIG. 1

Database Recovery Progress Report

Processing Mode: 1. Recovery    2. Unchanged    3. Batch JCL – Print report    4. Runstats
Mode selected: Recovery Recovery Start Time: 2011-12-01-12.12.33    (YYYY-MM-DD-HH.MM.SS)
Group Name: ___ (input Group name for objects)_    Database(s): RMDB4*
                                                    Tablespace partitions: *
                                                    Include Index partitions:   Yes   (Yes/No)

D – to Request details/list of individual partitions/objects

| | Objects | | % of Data |
|---|---|---|---|
| Tablespace Partitions | | | |
|    D- Recovered | 2 | (1%) | (50%) |
|    - Not Recovered | 423 | (99%) | (50%) |
| Index Partitions | | | |
|    - Recovered | 19 | (3%) | (5%) |
|    - Rebuilt | 9 | (1%) | (3%) |
|    - Not Rec/Reb | 451 | (96%) | (92%) |
| Total Partitions (total database objects) | | | |
|    - Rec/Reb | 30 | (3%) | (33%) |
|    - Not Rec/Reb | 874 | (97%) | (67%) |
| Log Records Applied for Recovery | | | |
|    - Applied | 2 | (4%) | (2%) |
|    - Not Yet Applied | 48 | (96%) | (98%) |

Database Recovery Progress Report

Processing Mode: 1. Recovery    2. Unchanged    3. Batch JCL – Print report    4. Runstats
Mode selected: Unchanged Recovery Start Time: 2011-12-01-12.12.33   (YYYY-MM-DD-HH.MM.SS)
Group Name: ___ (input Group name for objects)_    Database(s): RMDB4*
                                                        Tablespace partitions: *
                                                        Include Index partitions: Yes (Yes/No)

| | Objects | | % of Data |
|---|---|---|---|
| Unchanged Partitions | | | |
|   -Tablespaces | 349 | (38%) | (40%) |
|   -Indexes | 446 | (49%) | (35%) |
| Changed Partitions | | | |
|   -Tablespaces | 76 | (8%) | (15%) |
|   -Indexes | 33 | (5%) | (10%) |
| Total Partitions (total database objects) | | | |
|   -Tablespaces | 425 | (46%) | (50%) |
|   -Indexes | 479 | (54%) | (50%) |

DATABASE RECOVERY PROGRESS REPORT

TECHNICAL FIELD

This description is directed generally to database recovery, and in particular, to a computer-implemented method, apparatus, and computer program product for a database recovery progress report.

BACKGROUND

A database may store information in the form of database objects, which may include, for example, tablespaces and indexes. A tablespace is a storage location or a storage unit where the actual data may be kept or stored. A database index (or index) is a data structure that improves the speed of data retrieval operations on a database table or tablespace at the cost of slower writes and increased storage space. Indexes can be created using one or more columns of a database table (which may be stored in a tablespace), providing the basis for both rapid random lookups and efficient access of ordered records. An index, for example, may allow a lookup into a database table based one or more fields. For example, one index may allow employee records to be looked up or accessed based on social security number of the employee. Each tablespace and index may have an object name.

Tablespaces may be divided or organized into tablespace partitions. For example, an employee database may be partitioned into 50 tablespace partitions, with one tablespace partition providing table data for each state of employee residence. Indexes may also be partitioned into index partitions. A database table is a set of data elements (values) that is organized using a model of vertical columns and horizontal rows. A table may be stored in one or more tablespace partitions, for example.

In some cases, data in a database may become lost or corrupted. Therefore, in such a situation, a database (or data) recovery may be performed to recover data (one or more database objects or the entire database(s)).

SUMMARY

In one general aspect, a computer program product is provided. The computer program product is tangibly embodied on a computer-readable storage medium and includes executable code that, when executed, is configured to cause at least one data processing apparatus to receive a start time. The start time may be any time, and may be, for example, a time that a database recovery was started by a database recovery utility. The executable code is further configured to cause at least one data processing apparatus to select one or more database objects for which a database recovery progress report is to be provided, determine, based on an object recovery table generated by the database recovery utility, which of the selected database objects have been recovered since the start time, and output a database recovery progress report that identifies at least a number or percentage of the selected database objects that have been recovered by the database recovery utility since the start time.

In another general aspect, a computer implemented method is provided that includes receiving a start time, selecting one or more database objects for which a database recovery progress report is to be provided, determining, based on an object recovery table generated by the database recovery utility, which of the selected database objects have been recovered since the start time, and outputting a database recovery progress report that identifies at least a number or percentage of the selected database objects that have been recovered by the database recovery utility since the start time.

In another general aspect, an apparatus includes receiving logic configured to receive a start time, selecting logic configured to select one or more database objects for which a database recovery progress report is to be provided, determining logic configured to determine, based on an object recovery table generated by the database recovery utility, which of the selected database objects have been recovered since the start time, and outputting logic configured to output a database recovery progress report that identifies at least a number or percentage of the selected database objects that have been recovered by the database recovery utility since the start time.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
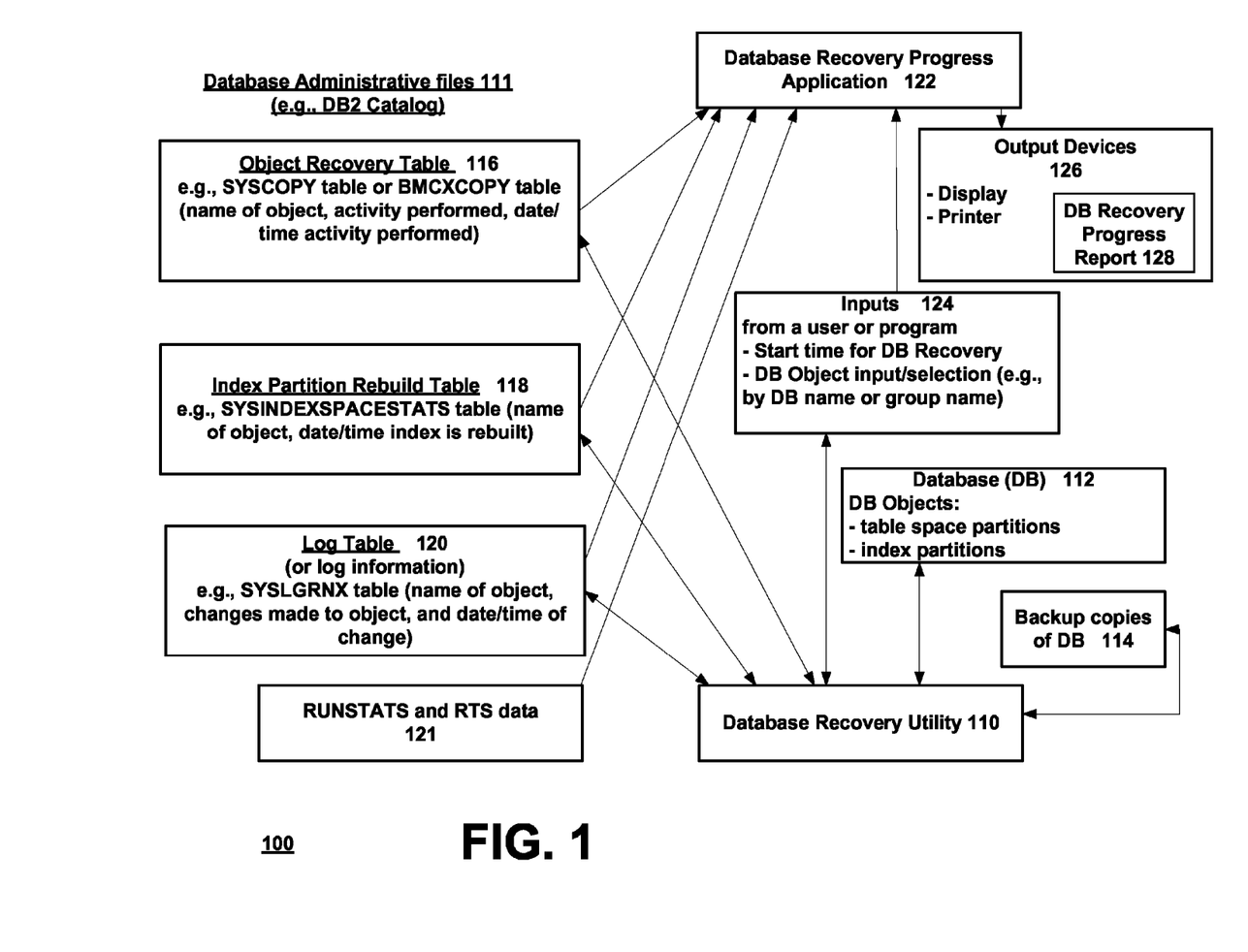
FIG. 1 is a block diagram illustrating a database recovery and recovery progress reporting system 100 according to an example implementation.

FIG. 1 is a block diagram illustrating a database recovery and recovery progress reporting system 100 according to an example implementation.

A database 112 may be stored in one or more disks or hard drives, RAID systems, or other storage devices. Database 112 may include one or more database objects, such as one or more tablespaces or tablespace partitions and one or more indexes or index partitions. In some cases, the terms tablespace and tablespace partitions may be used interchangeably. And, the terms index and index partitions may be used interchangeably.

One or more backup copies 114 of the database may be stored on tape and/or disk. A backup copy 114 of database 112 may be made or stored periodically, e.g., every night at midnight, every other day, every 6 hours, every week, etc. For example, a backup copy of the current database 112 may have been last made or stored at midnight last night. A number of changes may have occurred to the database 112 since the backup copy 114 was last made or stored for the database.

A database recovery utility 110 may be provided to perform database recovery, e.g., when data has been corrupted or lost due to mechanical failure, or for any other reason that a database recovery or a data object recovery may be necessary. For example, for an IBM DB2 database, database recovery utility 110 may include the IBM DB2 Recovery Software that may be included with IBM DB2 database software. This is merely one example, and other database recovery utilities may be used.

In some cases, data in a database may become lost or corrupted. For example, one or more tapes, disks or hard drives or other storage devices that stores the database may experience a mechanical failure (lost data) or an application may erroneous access and overwrite the data in a database, which may cause data to become corrupted. These are merely some examples, and there are other ways in which a database may become corrupted or lose data, or render the data in the database inaccessible. In such case, as examples, it may be necessary to recover the database objects for the data that was lost or corrupted, or possibly to recover the entire database.

According to an example implementation, a number of database administrative files 111 or tables may be maintained for the database 112. These administrative files or tables may be generated or maintained by the database recovery utility 110, or other application, program or utility. These database administrative files 111 may include, for example, a log table 120 that may record the changes to one or more objects that were performed since a backup copy 114 of the database was made or stored. Thus, since a backup copy 114 of the database may be made or stored only at certain times or periodically, the log table 120 may allow database recovery utility 110 (or other program) to update a backup copy 114 based on changes made to database objects (as reflected by the log table 120) since the backup copy 114 was made or stored. Log table 120 may include log information, e.g., for each object changed or edited, the log 120 may identify, for example, at least the name of the database object that was changed, the changes made to the object, and the date and time that the change(s) were made to the object. Log table 120 may alternatively include only summary information or partial information, such as a list or range of objects that were changed, for example. In one example implementation, an IBM SYSLGRNX table may be used as the log table 120. In one example implementation, entries or rows may be added to log table 120 substantially immediately after a change to a database object has been performed or received by the database, e.g., in order to keep the log table 120 current or up to date.

According to one example implementation, a database recovery may be performed by database recovery utility 110. In one example implementation, database recovery utility 110 may access or receive a last backup copy 114 of the database, which may be stored on one or more tapes, disks or other storage devices. Database recovery utility 110 may identify and copy database objects from the backup copy 114 to a local or working copy. As noted, this last backup copy 114 does not include any changes to the database that were performed after storage of the backup copy 114. However, these recent changes may be identified or provided in the log table 120. Therefore, in one example implementation, to perform database recovery, the database recovery utility 110 may then perform updates or changes to objects of the last backup copy 114 of the database based on changes to objects identified by log table 120. In other words, the changes to objects identified by log table 120 are performed on backup copy 114 to update this copy of the database. In this manner the backup copy 114 of the database may be updated to become current. Other types of database recovery may be performed as well.

The database administrative files 111 may also include additional files, such as, for example, at least two additional files that may be generated and stored by database recovery utility during or in response to database recovery.

First, database administrative files 111 may include an object recovery table 116 may be generated by database recovery utility 110, e.g., during or in response to database recovery. In an example embodiment, database recovery utility 110 may add a row to object recovery table 116 for each object that is recovered or rebuilt (as examples). In an example embodiment, database recovery utility 110 may generate and add a row or entry in real-time (or near real-time) to object recovery table 116, e.g., a row or entry may be added to table 116 immediately after each object is recovered or rebuilt, for example. In an example implementation, each row or entry in object recovery table 116 may identify a name of the database object, the activity performed on the object (e.g., recovered or rebuilt), and the date and time that the activity was performed on the object.

An example of a portion of an object recovery table is illustrated below in Table 1 (by way of example):

TABLE 1

Example Object Recovery Table

| Object Name | Activity | Date/time |
|---|---|---|
| Tablespace partition 1 | Recovered | 06-03-11-11:42:09 |
| Tablespace partition 3 | Recovered | 06-03-11-11:57:21 |
| Tablespace partition 32 | Recovered | 06-05-11-02:43:44 |
| Index partition 12 | Recovered | 06-06-11-05:22:47 |
| Index partition 8 | Rebuilt | 06-07-11-04:33:01 |

In the example of Table 1, tablespace partitions 1 and 3 were recovered on Jun. 3, 2011, table space partition 32 was recovered on Jun. 5, 2011 and Index partition was recovered on Jun. 6, 2011. Recovery of an object may include, for example, obtaining a copy of the object from the last or most recent backup copy of the database 114, and then making changes (if any) to the object based on changes identified for the object in log table 120. According to one example implementation, immediately after an object is recovered (or rebuilt), a row or entry is added to object recovery table 116 to indicate that this activity has been performed for the specified object.

Table 1 also indicates that index partition 12 was rebuilt on Jun. 6, 2011 index partition 8 was rebuilt on Jun. 7, 2011. For example, in some cases, it may not be possible to recover an index partition. Therefore, in such case, database recovery utility 110 may rebuild (or recreate) the index partition based on one or more corresponding tablespace partitions. Other techniques may be used to rebuild an index partition. Some illustrative examples of an object recovery table may include an IBM SYSCOPY table, or a BMCXCOPY table. These are merely examples, and others may be used.

Database administrative files 111 may also include an index partition rebuild table 118 that may be generated by database recovery utility 110 to identify one or more index partitions that were rebuilt during database recovery. For example, the index partition rebuild table 118 may include, for each row or entry, a name of the index partition that was rebuilt, and a date and time that the index partition was rebuilt.

One example of an index partition rebuild table may include an IBM SYSINDEXSPACESTATS table. In one example implementation, an entry or row may be added to index partition rebuild table 118 substantially immediately after the index partition is rebuilt. In other words, in one example implementation, the entries to tables 116, 118 and/or 120 may be added as (or during), or substantially immediately after, the respective activities are performed, e.g., substantially in real-time. This may allow these tables to remain current or up to date as each of the recorded activities is performed.

According to an example embodiment, a database recovery progress application 122 may generate and display a database recovery progress report 128, which may be output on an output device 126. In an example implementation, database recovery progress report 128 may be generated and output by database recovery progress application 122 based on information provided or stored in one or more of files or tables of database administrative files 111, including object recovery table 116, index partition rebuild table 118, and log table 120. Output device 126 may be, for example, a display, a printer, or other output device. In some cases, database recovery can be a time-consuming process, and the database recovery progress report 126 may provide a substantially real-time (e.g., provided as the database recovery is being performed) status update to a user as to the progress of a database recovery.

The database recovery progress report 126 may be provided on demand from a user, e.g., where the report 126 is re-generated and output (e.g., displayed or printed) based on updated data, such as based on updated data from one or more tables (116, 118 and/or 120) of database administrative files 111, in response to a user request. For example, a user at a keyboard may type a special command key and hit enter to request, or select a button on a graphical user interface (GUI), such as a "update progress report") button, which may cause the database recovery progress application 122 to generate and output an updated report 126. Alternatively, the database recovery progress report 126 may be automatically generated by database recovery progress application 122 and output periodically, e.g., every X seconds, to one or more output devices 126.

In an example implementation, database recovery progress application 122 may receive one or more inputs 124, such as a start time, which may be any time for which a user may want to see data relating to database recovery for a specific time period (e.g., from the designated start time to the current time). In one example implementation, the start time may be a time that identifies when the recovery was started by database recovery utility 110. Other times may be used as well for the start time, based on user input, for example. For example, a start time may be selected for which a user may wish to measure and display recovery statistics for a database recovery.

RUNSTATS and Realtime Statistics (RTS) data 121 may also be input to database recovery progress application 122. The RUNSTATS and RTS data 121 may be stored in the DB2 catalog or administrative files 111 and may be used to estimate the amount of data (e.g., megabytes) that has been recovered and remains to be recovered. This may be used to provide an estimate of the amount of time left for database recovery, e.g., based on time to recover a portion of data, and an amount of data still remains to be recovered, for example.

Inputs 124 may also include a selection of one or more database objects for which a database recovery progress report is to be provided (or is being requested). The selection or input of one or more database objects may be input or selected as a list of one or more databases, where each database is associated with a group (or plurality of) database objects. Or, a user may manually type in or select (e.g., from a menu) one or more database objects, or may input or select a Group Name that is associated with a plurality of database objects. In an example implementation, database recovery progress application 122 may receive such a selection of a group of (or one or more) database objects, and may then collect data (e.g., from one or more of tables 116, 118, and/or 120, or other source) regarding actions or activities performed on or with respect to such selected objects, and then output this information within database recovery progress report 128.

In an example implementation, the progress report 128 may report or include actions or activities performed on or with respect to such selected database objects on or after the database recovery start time (one of inputs 124). This is because, for example, the database recovery progress report 128 should typically report only recovery activities that occurred on or after this database recovery was started, and not include activities that may have occurred prior to the database recovery start time. The database recovery start time may be manually input by a user, or may be automatically received by database recovery progress application 122 from database recovery utility 110.

Referring to FIG. 1, one or more (or even all) of the items or blocks shown in FIG. 1 (with the exception of output devices 126) may be stored in a memory, hard drive or other computer storage device. For example, tables 116, 118, 120, inputs 124, database recovery progress report 128, and database 112 and backup copies 114 may be stored in memory or a storage device on one or more computer(s) or server(s). Database recovery utility 110 and database recovery progress application 122 may be stored in memory or a storage device and may include software or executable instructions that may be executed or run by a processor(s) of one or more computers or servers, for example.

Figure 2:
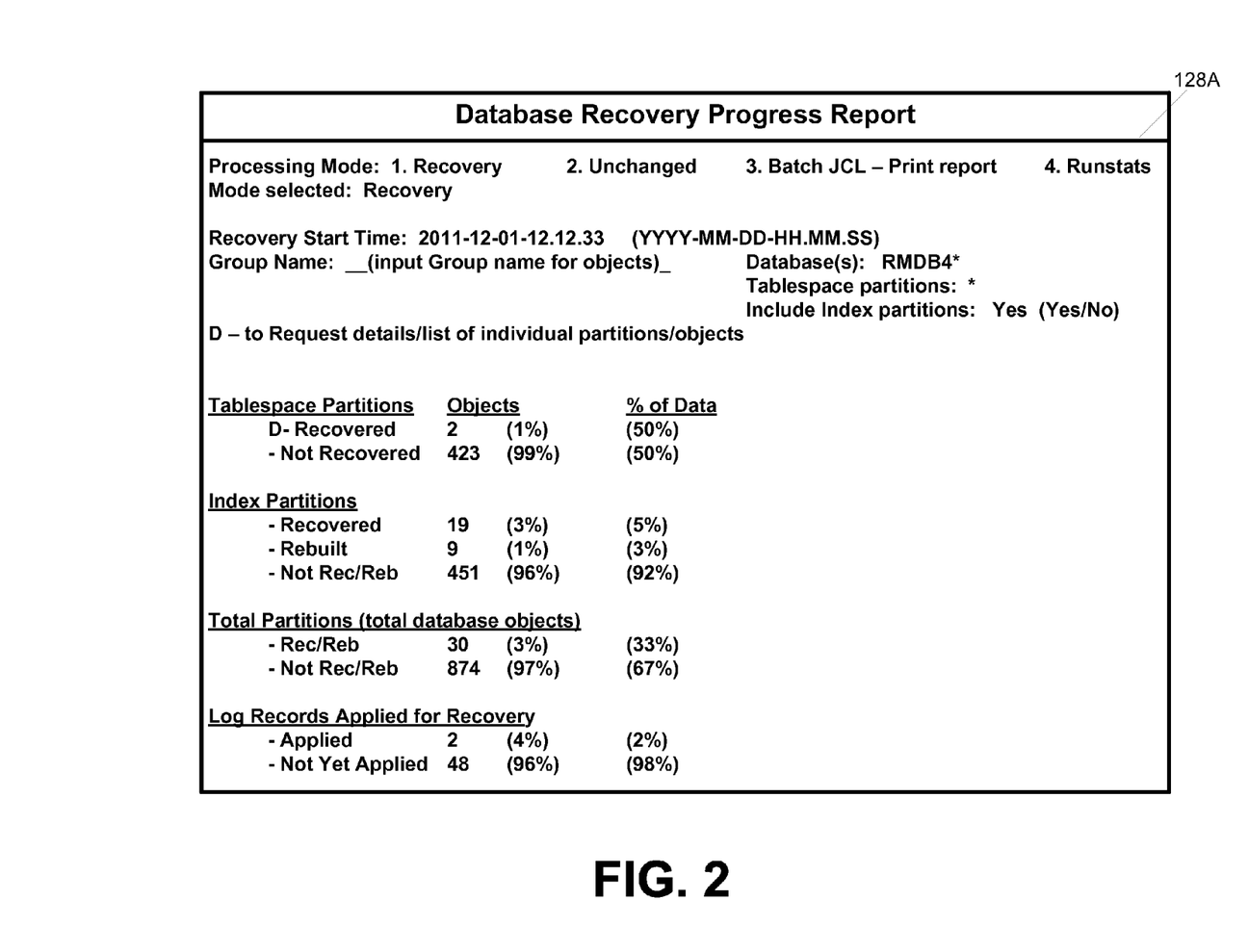
FIG. 2 is a diagram illustrating database recovery progress report 128A for a recovery mode of operation according to an example implementation.

FIG. 2 is a diagram illustrating database recovery progress report 128A for a recovery mode of operation according to an example implementation. According to an example implementation, database recovery progress application may operate in one of several different modes, such as 1) a recovery mode in which database recovery information is obtained and displayed; 2) an unchanged mode in which one or more objects that are unchanged (e.g., since a previous backup 114 was stored) are identified and information relating to such unchanged objects is included in the report 128; 3) Batch JCL or print report, in which the database recovery progress report 128 is printed onto paper (e.g., if mode 3 is not selected, then the database recovery progress report 128 may be output onto a display, for example); and 4) Runstats mode in which statistics are obtained and used for various inputs. RUNSTATS mode will run the RUNSTATS utility which collects statistics on the database objects, such as their size. This information can be used later in the recovery mode to estimate the amount of data recovered and the amount that is left to recover. The RUNSTATS data may be stored in the DB2 catalog. Alternatively, a RTS (realtime statistics) data may be used to estimate size of database objects. According to an example implementation, for interactive version of operation, only one of these modes may be selected, while in another example implementation, multiple modes may be selected and displayed at the same time, e.g., during a batch version of operation. In batch version, for example, recovery mode, unchanged mode and all object detail reports are displayed in a single execution.

As shown in the database recovery progress report 128A, the database recovery progress application 122 is operating in recovery mode (in this example), and obtains and reports information related to the status or progress of the database recovery. A recovery start time is received or input. In this example, a start time (e.g., date and time that database recovery was started) is specified as 2011-12-01-12.12.33. In addition, a group of database objects may be selected for reporting. The group of database objects may be selected, e.g., by specifying one or more databases, where each database includes a set of known or associated objects. In this example, a set of databases has been selected: Database(s): RMDB4*, where the * is a wild card that may indicate a range of databases. The database recovery progress report may be generated and output for the database objects for the selected group of database objects, e.g., database objects for the database(s) RMDB4*. Alternatively, a set of database objects may be selected for reporting by inputting a Group Name that is associated with a group or plurality of database objects. Other techniques may be used to select or identify a group of database objects for which a database recovery progress report is to be provided. The selected group of database objects may be all of the objects that are being recovered as part of a database recovery, or may only be a subset of such database objects that are being recovered in a database recovery, for example.

In addition, as shown on the report 128A in FIG. 2, an option is provided for a user to select to include index partitions in report 128A. If index partitions is selected (e.g., a Y or Yes input next to this question), then index partitions will be included in the database recovery progress report. In addition, database recovery progress application may access one or more database administrative files to determine, for each listed database object, the type of object (e.g., either a tablespace partition, or an index partition) and the size of the object (e.g., size of object in bytes or Megabytes, or MB).

As shown in FIG. 2, database recovery progress application 122 may determine, based on the object recovery table 116 generated by the database recovery utility 110, which of the selected objects have been recovered since the start time (e.g., since the start of the database recovery). For example, the database recovery progress application 122 may determine, based on object name, an activity performed (e.g., recovered or rebuilt) for each object, and the date/time listed for each entry or listed object in the object recovery table 116, which of the selected database objects have been recovered since the start time. For example, to accomplish this, the database recovery progress application 122 may compare names from the selected database objects to names of the objects in the database recovery table 116 to identify any selected objects that appear in the database recovery table. For any selected objects that appear in the object recovery table, identify those entries that have a time equal to or greater than the start time, since these are the recovery/rebuild activities of interest (for objects that match the selected objects, and for activities that occurred on or after the start time).

Therefore, in this manner, the database recovery progress application 122 may determine and display the number of table space partitions recovered (2 in this example) and the number of tablespace partitions not recovered (423). As noted above, the database recovery progress application may obtain the total number of tablespace partitions and index partitions from the database administrative files 111, based on the list of selected database objects. In this example, there were only two entries or rows in the object recovery table 116 for objects that match the selected objects, for recoveries that occurred on or after the start time. While there were 425 total tablespace partitions, this leaves 423 tablespace partitions that were not (yet) recovered as of the time this report was generated. Also, the approximate percentage of tablespace partitions recovered (1%) and not recovered (99%) are also listed on the report 128A, as shown in FIG. 2.

The total amount of data, e.g., as a percentage, is displayed, since not all objects are the same size. In this simple example, the 2 recovered tablespace partitions make up 50% of the data recovered for tablespace partitions, and the remaining 423 tablespace partitions that have not been recovered make up the other 50% of data for table space partitions. This is merely one example. The percent of data is also listed for index partitions, total partitions, and number of log records applied for recovery. The total amount of data may also be displayed as an amount of data, e.g., number of megabytes (MBs).

Similarly, the database recovery progress application 122 may determine and provide (in the report 128A) the number of recovered and the number of not recovered index partitions, e.g., which may be determined based on the object recovery table 116. For example, to determine a number of recovered index partitions for this report, entries are listed in the object recovery table may be counted that have an object name that matches an object in the selected group of objects, have an activity listed as "recovered" and having a date/time that is one or after the start time for the database recovery, for example. In the example shown in FIG. 2, the number of index partitions that have been recovered is shown as 19 (or about 4% of the 479 index partitions).

In addition, database recovery progress application 122 may determine, based on the index partition rebuild table 118, which of the selected index partitions have been rebuilt. The name of each object (index partition) and date/time listed in each row of the index partition rebuild table 118 (which lists object names and time of rebuild for one or more rebuild index partitions) is compared to the names of the selected objects and the start time to determine if any selected index partitions were rebuilt on or after (or since) the start time. In this example report 128A shown in FIG. 2, 9 index partitions have been rebuilt as of the time this report is generated and displayed, which leaves 451 index partitions that have not been rebuilt or recovered. Thus, as shown in report 128A, there have been 19 index partitions recovered (4% of the index partitions, 5% of the data for index partitions), based on the object recovery table 116, and 9 index partitions (corresponding to 2% of the index partitions and 3% of the data for index partitions) have been rebuilt based on the index partition rebuild table 118, leaving the remaining 451 index partitions as not being recovered or rebuilt (not rec/reb), in this example.

The total number of partitions (both table space partitions and index partitions is listed as 904, with 30 partitions (2 tablespace partitions and 28 index partitions) being recovered or rebuilt, with the 30 partitions corresponding to 3% of the partitions and 33% of the partition data. And, the remaining 874 partitions have not been recovered or rebuilt, which corresponds to about 97% of the partitions, and 67% of the data for partitions. The data for the total partitions can be obtained from the numbers of the recovered/not recovered from the tablespace partition data, and from the numbers of recovered, rebuilt and not rec/reb of index partitions.

In addition, the database recovery progress application 122 may determine and display or output (as part of report 128A) a number of log records applied for recovery, based on log table 120. As noted, log table 120 may include the name of an object, changes made to the object, and a date/time of the change to the object. This log table may be used to update a backup copy 114, as part of database recovery. Therefore, a database recovery progress report 128/128A may include this information that identifies the number of log records applied for recovery, and the number of log records not applied for recovery. For example, applying a log record for recovery means that the change indicated by the log record has been performed to the identified database object of the backup copy 114, in order to (at least partially) update the backup copy 114 of the database. In the example report 128A shown in FIG. 2, 2 of the log records (corresponding to about 4% of the log records, and 2% of the data) have been applied for recovery, while the remaining 48 log records (corresponding to about 96% of the log records and 98% of the data for log records) have not yet been applied for data recovery.

As time goes by (for future database recovery progress reports 128), and the database recovery progresses, these numbers will change (e.g., the number of objects recovered or rebuilt will increase over time, the number of applied log records will increase, etc.) until the database recovery (recovery and/or rebuilding) of the database objects is completed.

According to an example implementation, one or more of the items or object types listed in the database recovery progress report 128A (FIG. 2) may be selected to display more detailed information, such as list information for each of the database objects of the selected object type. For example, a "D" may be typed in in front of one of the object types, such as in front of the "Recovered" tablespace partitions to indicate that information (e.g., object name, activity, and date/time the activity was performed, in this case activity was recovered) should be provided for each of the database objects of this selected object type. Therefore, in this example, a "D", to request more details, was typed in front of the "Recovered" tablespace partitions, and the object name, activity=recovery, and time/date may be displayed for each of the 2 recovered tablespace partitions within the report 128A or below the report, for example.

Figure 3:
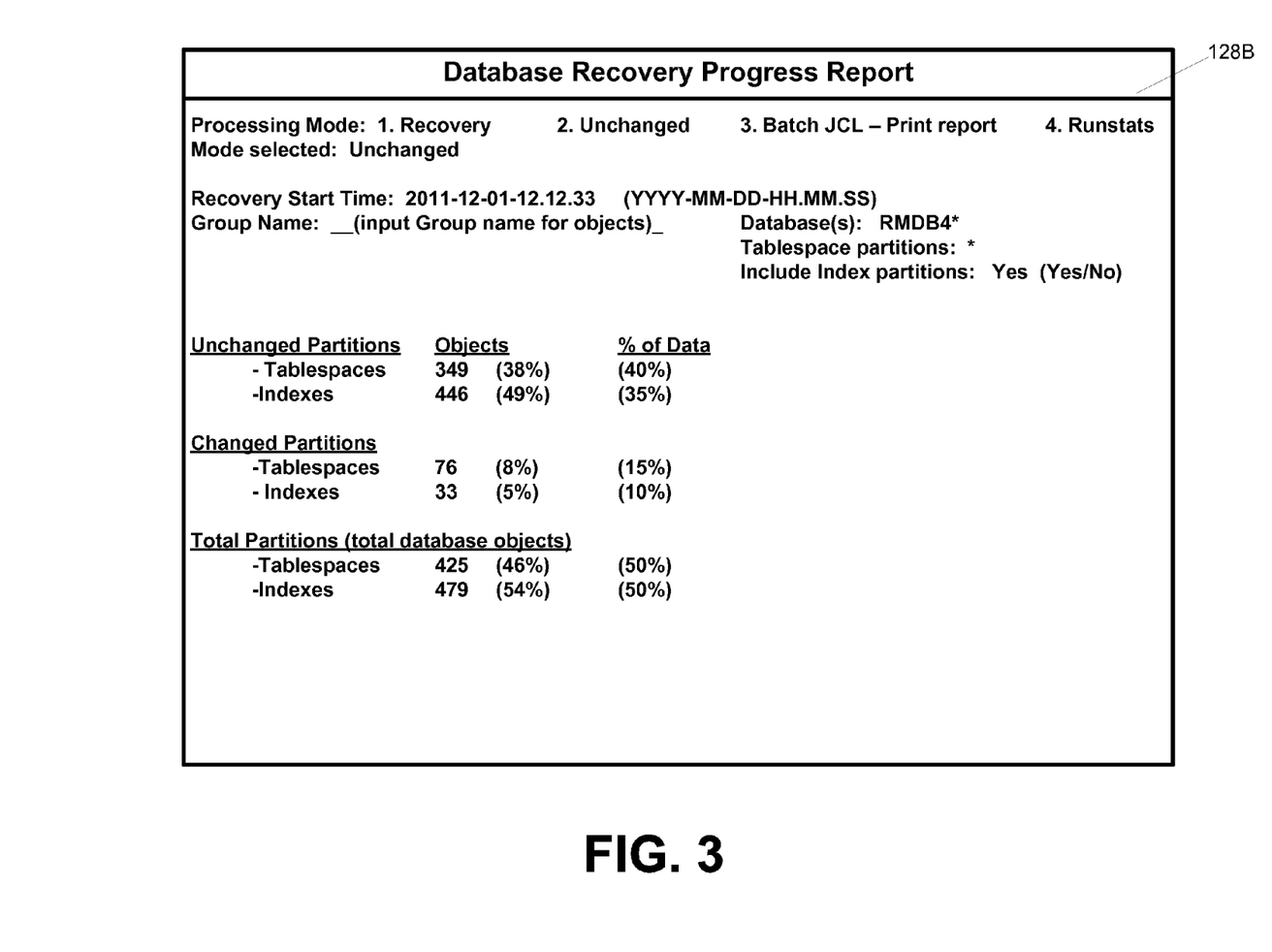
FIG. 3 is a diagram illustrating a database recovery progress report 128B where a selected mode is to identify unchanged partitions or objects.

FIG. 3 is a diagram illustrating a database recovery progress report 128B where a selected mode is to identify unchanged partitions or objects. According to one example implementation, it is not necessary to recover (or update) an object using the log table 120 if the object has not changed since the last backup copy 114 was made. In such a case, the copy in the backup copy 114 may be kept without being updated, for example. Therefore, in one example implementation, a user may select an unchanged mode to display a number and percent of unchanged partitions, changed partitions and total partitions. In the example shown in FIG. 2, the database recovery progress application 128 determined and outputs to report 128B the number (349) and percentage (38%) of unchanged tablespaces, the number (446) and percentage (49%) of unchanged indexes, the number (76) and percentage of changed tablespaces, and the number (33) and percentage (5%) of changed indexes. The total amount of data is also shown on report 128B for each of these items as well.

For example, the database recovery progress application 122 may determine a total number of tablespace partitions and total number of index partitions from the selected group of database objects for which a report should be generated. The number of changed tablespace partitions and index partitions (e.g., the number of these objects that changed since the last backup copy 114 was made) may be determined from the log table 120, for example. Therefore, from this information, database recovery progress application 122 may display the information shown in report 128B. The total number and percentage of partitions (total of changed and unchanged partitions and indexes is also provided.

Figure 4:
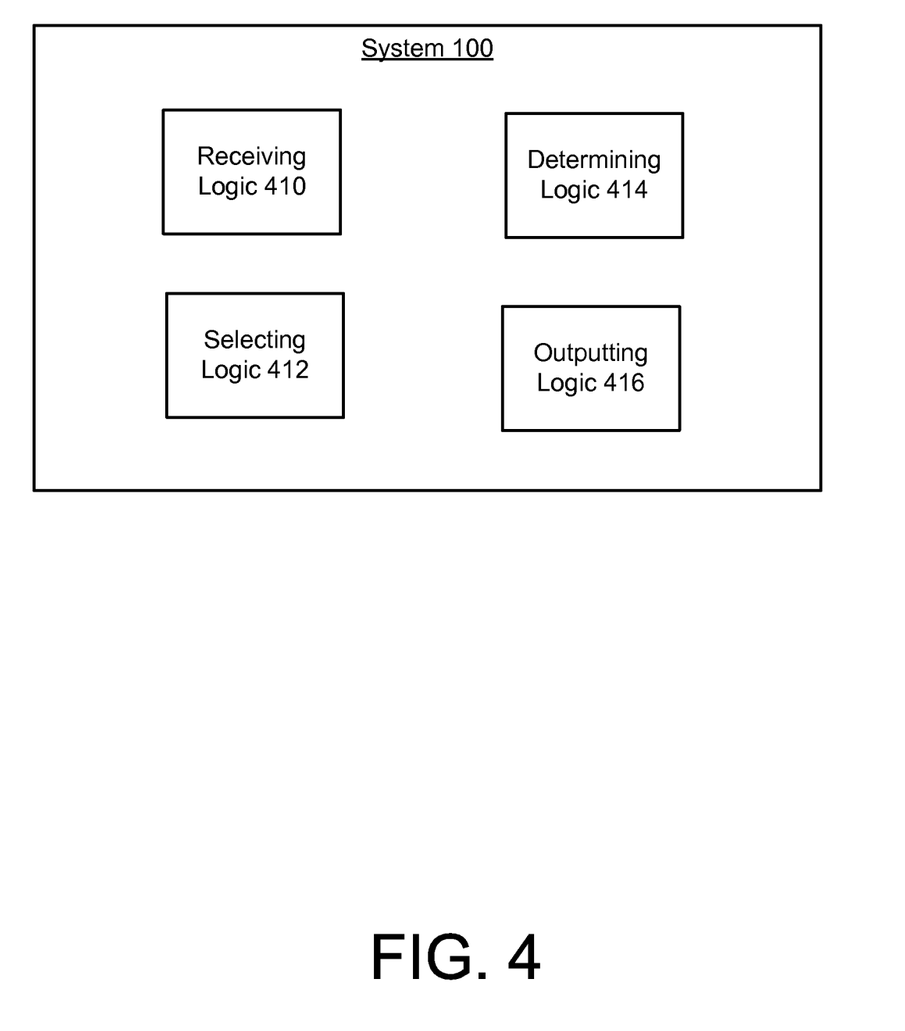
FIG. 4 is a diagram illustrating a system 100 according to an example implementation.

FIG. 4 is a diagram illustrating a system 100 according to an example implementation. System 100 may include receiving logic 410 configured to receive a start time, the start time identifying a time that a database recovery was started by a database recovery utility, selecting logic 412 configured to select one or more database objects for which a database recovery progress report is to be provided, determining logic 414 configured to determine, based on an object recovery table generated by the database recovery utility, which of the selected database objects have been recovered since the start time, and outputting logic 416 configured to output a database recovery progress report that identifies at least a number or percentage of the selected database objects that have been recovered by the database recovery utility since the start time.

The apparatus wherein the outputting logic may include outputting logic that is further configured to output on a display a database recovery report that identifies at least: a number of tablespace partitions and a number of index partitions that have been recovered since the start time, a percentage of tablespace partitions and a percentage of index partitions that have been recovered since the start time, and a percentage of data of the selected objects that have been recovered since the start time.

The apparatus wherein the outputting logic may include outputting logic that is further configured to output the number and/or percentage of the selected database objects, including index partitions, that have been rebuilt since the start time.

The apparatus wherein the outputting logic may include outputting logic that is further configured to output the number and/or percentage of the log records that have been applied since the start time by database recovery utility to perform the database recovery.

Figure 5:
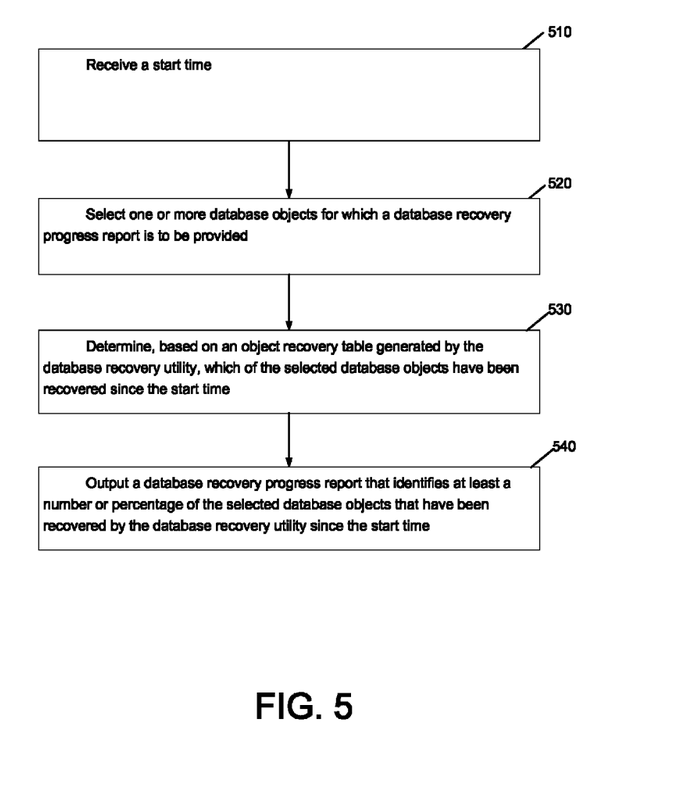
FIG. 5 is a flow chart illustrating operation of system 100 according to an example implementation.

FIG. 5 is a flow chart illustrating operation of system 100 according to an example implementation. The method may include: receiving (510) a start time, the start time identifying a time that a database recovery was started by a database recovery utility, selecting (520) one or more database objects for which a database recovery progress report is to be provided, determining (530), based on an object recovery table generated by the database recovery utility, which of the selected database objects have been recovered since the start time, and outputting (540) a database recovery progress report that identifies at least a number or percentage of the selected database objects that have been recovered by the database recovery utility since the start time.

The method wherein the outputting may include outputting on a display a database recovery report that identifies at least a number of tablespace partitions and a number of index partitions that have been recovered since the start time.

The method wherein the outputting may include outputting on a display a database recovery report that identifies at least a percentage of tablespace partitions and a percentage of index partitions that have been recovered since the start time.

In addition, a computer program product may be provided, the computer program product being tangibly embodied on a computer-readable storage medium and including executable code that, when executed, is configured to cause at least one data processing apparatus to: receive a start time, the start time identifying a time that a database recovery was started by a database recovery utility, select one or more database objects for which a database recovery progress report is to be provided, determine, based on an object recovery table generated by the database recovery utility, which of the selected database objects have been recovered since the start time, and output a database recovery progress report that identifies at least a number or percentage of the selected database objects that have been recovered by the database recovery utility since the start time.

The computer program product wherein the database objects include at least one of tablespaces or tablespace partitions and indexes or index partitions.

The computer program product wherein the object recovery table includes an IBM SYSCOPY table or a BMCX-COPY table.

The computer program product wherein the executable code configured to cause at least one data processing apparatus to select includes the executable code being configured to cause at least one data processing apparatus to receive a list of one or more databases, each database including a plurality of database objects.

The computer program product wherein the executable code being configured to cause at least one data processing apparatus to select includes the executable code being configured to cause at least one data processing apparatus to receive a group name that is associated with a group of database objects for which a database recovery progress report is to be provided.

The computer program product wherein the object recovery table identifies for each of a plurality of database objects at least an object name, an activity performed on the object, and a date/time that the activity was performed, wherein the activity performed identifies object recovery as the activity performed for at least one database object in the object recovery table. In an example implementation, the executable code configured to cause at least one data processing apparatus to determine may include the executable code being configured to cause at least one data processing apparatus to: compare names from the selected database objects to names of the database objects in the database recovery table, determine, based on the database recovery table, an activity performed and a time that the activity was performed for one or more of the selected database objects in the database recovery table, determine, based on the object recovery table, which of the selected objects have been recovered on or after the start time. In an other example implementation, the executable code may configured to cause at least one data processing apparatus to determine, based on the object name, an activity performed on the object, and a date/time that the activity was performed provided for each database object within the object recovery table, which of the selected objects have been recovered on or after the start time.

The computer program product wherein the executable code being configured to output may include the executable code being configured to cause at least one data processing apparatus to output on a display a database recovery report that identifies at least a number of tablespace partitions and a number of index partitions that have been recovered between the start time and a time the database recovery report is output.

The computer program product wherein the executable code being configured to output may include the executable code being configured to cause at least one data processing apparatus to output on a display a database recovery report that identifies at least a percentage of tablespace partitions and a percentage of index partitions that have been recovered between the start time and a time the database recovery report is output.

The computer program product wherein the executable code being configured to output may include the executable code being further configured to cause at least one data processing apparatus to output on a display, as part of the database recovery report, a percentage of the data of the selected objects that have been recovered since the start time.

The computer program product wherein the executable code is further configured to cause at least one data processing apparatus to determine, based on an index partition rebuild table generated by the database recovery utility, a number and/or percentage of the selected database objects, including index partitions, that have been rebuilt by the database recovery utility since the start time; an wherein the executable code being configured to output may include the executable code being further configured to cause at least one data processing apparatus to output on a display, as part of the database recovery report, the number and/or percentage of the selected database objects, including index partitions, that have been rebuilt since the start time.

The computer program product wherein the executable code is further configured to cause at least one data processing apparatus to determine, based on at least a portion of a log table generated by the database recovery utility that logs changes to a database since a backup copy of the database was made or based on a summary of the log table, a number and/or percentage of the log records that have been applied since the start time by database recovery utility to perform the database recovery; wherein the executable code being configured to output may include the executable code being further configured to cause at least one data processing apparatus to output on a display, as part of the database recovery report, the number and/or percentage of the log records that have been applied since the start time by database recovery utility to perform the database recovery.

The computer program product wherein the log table or summary of the log table comprises a SYSLGRNX table.

The computer program product wherein the executable code is further configured to cause at least one data processing apparatus to determine, based on at least a portion of a log table generated by the database recovery utility that logs changes to a database or based on a summary of the log table, which of the selected database objects have not changed and therefore do not need to be recovered; wherein the executable code being configured to output comprises the executable code being further configured to cause at least one data processing apparatus to output on a display, as part of the database recovery report, the number and/or percentage of the database objects, including tablespace partitions and index partitions, which have not changed.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a computer-readable storage medium and including executable code that, when executed, is configured to cause at least one data processing apparatus to:
   receive a start time;
   select a plurality of database objects including one or more tablespace partitions and one or more index partitions for which a database recovery progress report is to be provided;
   determine, based on an object recovery table generated by the database recovery utility, which of the selected one or more tablespace partitions and one or more index partitions have been recovered since the start time; and
   output a database recovery progress report that identifies progress of database object recovery as database object recovery is performed based on the object recovery table, the database recovery progress report including at least a number or percentage of the selected one or more tablespace partitions and a number or percentage of the selected one or more index partitions that have been recovered by the database recovery utility since the start time.

2. The computer program product of claim 1 wherein the object recovery table comprises an IBM SYSCOPY table or a BMCXCOPY table.

3. The computer program product of claim 1 wherein the executable code being configured to cause at least one data processing apparatus to select comprises the executable code being configured to cause at least one data processing apparatus to receive a list of one or more databases, each database including one or more tablespace partitions and one or more index partitions.

4. The computer program product of claim 1 wherein the executable code being configured to cause at least one data processing apparatus to select comprises the executable code being configured to cause at least one data processing apparatus to receive a group name that is associated with a group of database objects for which a database recovery progress report is to be provided.

5. The computer program product of claim 1 wherein the object recovery table identifies for each of a plurality of database objects at least an object name, an activity performed on the object, and a date/time that the activity was performed, wherein the activity performed identifies object recovery as the activity performed for at least one database object in the object recovery table.

6. The computer program product of claim 5 wherein the executable code configured to cause at least one data processing apparatus to determine comprises the executable code being configured to cause at least one data processing apparatus to:
   compare names from the selected database objects to names of the database objects in the database recovery table;
   determine, based on the database recovery table, an activity performed and a time that the activity was performed for one or more of the selected database objects in the database recovery table;
   determine, based on the object recovery table, which of the selected objects have been recovered on or after the start time.

7. The computer program product of claim 5 wherein the executable code being configured to cause at least one data processing apparatus to determine comprises the executable code being configured to cause at least one data processing apparatus to:
   determine, based on the object name, an activity performed on the object, and a date/time that the activity was performed provided for each database object within the object recovery table, which of the selected objects have been recovered on or after the start time.

8. The computer program product of claim 1 wherein the executable code being configured to output comprises the executable code being configured to cause at least one data processing apparatus to output on a display a database recovery report that identifies at least a number of tablespace partitions and a number of index partitions that have been recovered between the start time and a time the database recovery report is output.

9. The computer program product of claim 1 wherein the executable code being configured to output comprises the executable code being configured to cause at least one data processing apparatus to output on a display a database recovery report that identifies at least a percentage of tablespace partitions and a percentage of index partitions that have been recovered between the start time and a time the database recovery report is output.

10. The computer program product of claim 1 wherein the executable code being configured to output comprises the executable code being further configured to cause at least one data processing apparatus to output on a display, as part of the database recovery report, a percentage of the data of the selected objects that have been recovered since the start time.

11. The computer program product of claim 1 wherein the executable code is further configured to cause at least one data processing apparatus to determine, based on an index partition rebuild table generated by the database recovery utility, a number and/or percentage of the selected database objects, including index partitions, that have been rebuilt by the database recovery utility since the start time; and wherein the executable code being configured to output comprises the executable code being further configured to cause at least one data processing apparatus to output on a display, as part of the database recovery report, the number and/or percentage of the selected database objects, including index partitions, that have been rebuilt since the start time.

12. The computer program product of claim 1 wherein the executable code is further configured to cause at least one data processing apparatus to determine, based on at least a portion of a log table generated by the database recovery utility that logs changes to a database since a backup copy of the database was made or based on a summary of the log table, a number and/or percentage of the log records that have been applied since the start time by database recovery utility to perform the database recovery;

wherein the executable code being configured to output comprises the executable code being further configured to cause at least one data processing apparatus to output on a display, as part of the database recovery report, the number and/or percentage of the log records that have been applied since the start time by database recovery utility to perform the database recovery.

13. The computer program product of claim 12 wherein the log table or summary of the log table comprises a SYSLGRNX table.

14. The computer program product of claim 1 wherein the executable code is further configured to cause at least one data processing apparatus to determine, based on at least a portion of a log table generated by the database recovery utility that logs changes to a database or based on a summary of the log table, which of the selected database objects have not changed and therefore do not need to be recovered;

wherein the executable code being configured to output comprises the executable code being further configured to cause at least one data processing apparatus to output on a display, as part of the database recovery report, the number and/or percentage of the database objects, including tablespace partitions and index partitions, which have not changed.

15. A computer implemented method for executing instructions stored on a non-transitory computer-readable storage medium, the method comprising:

receiving a start time;
selecting a plurality of database objects including one or more tablespace partitions and one or more index partitions for which a database recovery progress report is to be provided;
determining, based on an object recovery table generated by the database recovery utility, which of the selected one or more tablespace partitions and one or more index partitions have been recovered since the start time; and
outputting a database recovery progress report that identifies progress of database object recovery as database object recovery is performed based on the object recovery table, the database recovery progress report including at least a number or percentage of the selected one or more tablespace partitions and a number or percentage of the selected one or more index partitions that have been recovered by the database recovery utility since the start time.

16. The computer implemented method of claim 15 wherein the start time is a start time identifying a time that a database recovery was started.

17. The computer implemented method of claim 15 wherein the outputting comprises outputting on a display a database recovery report that identifies at least a number of tablespace partitions and a number of index partitions that have been recovered since the start time.

18. The computer implemented method of claim 15 wherein the outputting comprises outputting on a display a database recovery report that identifies at least a percentage of tablespace partitions and a percentage of index partitions that have been recovered since the start time.

19. An apparatus comprising:

at least one processor;
instructions recorded on a non-transitory computer-readable medium, and executable by the at least one processor, the apparatus including:
receiving logic configured to receive a start time;
selecting logic configured to select a plurality of database objects including one or more tablespace partitions and one or more index partitions for which a database recovery progress report is to be provided;
determining logic configured to determine, based on an object recovery table generated by the database recovery utility, which of the selected one or more tablespace partitions and one or more index partitions have been recovered since the start time; and
outputting logic configured to output a database recovery progress report that identifies progress of database object recovery as database object recovery is performed based on the object recovery table, the database recovery progress report including at least a number or percentage of the selected one or more tablespace partitions and a number of percentage of the selected one or more index partitions that have been recovered by the database recovery utility since the start time.

20. The apparatus of claim 19 wherein the outputting logic comprises outputting logic that is further configured to output on a display a database recovery report that identifies at least:

a number of tablespace partitions and a number of index partitions that have been recovered since the start time;
a percentage of tablespace partitions and a percentage of index partitions that have been recovered since the start time; and
a percentage of data of the selected objects that have been recovered since the start time.

21. The apparatus of claim 19 wherein the outputting logic comprises outputting logic that is further configured to output the number and/or percentage of the log records that have been applied since the start time by database recovery utility to perform the database recovery.

22. The apparatus of claim 19 wherein the start time comprises a start time identifying a time that a database recovery was started by a database recovery utility.

* * * * *